US010747550B2

(12) United States Patent
    Zhou

(10) Patent No.: US 10,747,550 B2
(45) Date of Patent: Aug. 18, 2020

(54) METHOD, TERMINAL AND STORAGE MEDIUM FOR STARTING SOFTWARE

(71) Applicant: TENCENT TECHNOLOGY (SHENZHEN) COMPANY LIMITED, Shenzhen (CN)

(72) Inventor: Wangsheng Zhou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 361 days.

(21) Appl. No.: 15/721,950

(22) Filed: Oct. 1, 2017

(65) Prior Publication Data
    US 2018/0024849 A1    Jan. 25, 2018

Related U.S. Application Data

(63) Continuation of application No. PCT/CN2016/080552, filed on Apr. 28, 2016.

(30) Foreign Application Priority Data
    Jun. 2, 2015 (CN) .......................... 2015 1 0295900

(51) Int. Cl.
    G06F 9/445 (2018.01)
    G06F 3/06 (2006.01)
    (Continued)

(52) U.S. Cl.
    CPC ...... G06F 9/44505 (2013.01); G06F 12/0862 (2013.01); G06F 9/445 (2013.01)

(58) Field of Classification Search
    CPC .. G06F 12/0862; G06F 12/08; G06F 9/30043; G06F 16/172; G06F 8/65;
    (Continued)

(56) References Cited

U.S. PATENT DOCUMENTS 8,424,018 B2 *  4/2013  Aho ........................ G06F 9/445
                                                         712/31
8,533,830 B1    9/2013  Dalcher
                (Continued)

FOREIGN PATENT DOCUMENTS

CN    102123318 A    7/2011
CN    102707966 A    10/2012
                (Continued)

OTHER PUBLICATIONS

Parate et al., Practical prediction and prefetch for faster access to applications on mobile phones, 10 pages (Year: 2013).*
                (Continued)

Primary Examiner — Thuy Dao
(74) Attorney, Agent, or Firm — Syncoda LLC; Feng Ma

(57) ABSTRACT

The disclosure relates to a method, terminal and storage medium for starting software. A method for starting software carried out in an electronic apparatus includes: configuration information, which is information for configuring a starting acceleration mode adopted for starting target software, is acquired; a starting acceleration level of the target software is determined according to the configuration information; at least one of a number of prefetching operations and number of files prefetched in each prefetching operation corresponding to the determined starting acceleration level is acquired; starting files of the target software are opened and data in the target software is prefetched into a memory in each prefetching operation according to the at least one of the determined number of prefetching operations and number of files prefetched in each prefetching operation; and the target software is started according to the data prefetched into the memory.

18 Claims, 10 Drawing Sheets

(51) Int. Cl.
  *G06F 15/177* (2006.01)
  *G06F 9/44* (2018.01)
  *G06F 9/00* (2006.01)
  *G06F 3/0481* (2013.01)
  *G06F 3/0484* (2013.01)
  *G06F 12/0862* (2016.01)

(58) Field of Classification Search
  CPC .............. G06F 16/951; G06F 16/9566; G06F 16/9674; G06F 9/44505; G06F 9/445; G06F 9/4406; G06F 9/44521; G06F 15/17381; G06F 16/2465; G06F 9/54; G06F 9/44578; G06F 9/44558; G06F 9/4843; H04L 67/2847; H04L 67/34; H04L 67/289; H04L 2463/101; H04L 67/02; G05F 12/0862
  See application file for complete search history.

(56) References Cited

U.S. PATENT DOCUMENTS

| | | | | |
|---|---|---|---|---|
| 8,880,862 | B2* | 11/2014 | Fallon | G06F 1/24 713/2 |
| 8,914,887 | B2 | 12/2014 | Dalcher | |
| 9,129,115 | B2 | 9/2015 | Dalcher | |
| 10,275,158 | B2* | 4/2019 | Kim | G06F 3/061 |
| 10,318,310 | B2* | 6/2019 | Wei | G06F 9/44521 |
| 2012/0265941 | A1 | 10/2012 | Chen | |
| 2013/0232215 | A1* | 9/2013 | Gupta | G06F 3/061 709/213 |
| 2014/0129814 | A1* | 5/2014 | Bi | G06F 9/4406 713/1 |
| 2014/0173728 | A1 | 6/2014 | Dalcher | |
| 2015/0020200 | A1 | 1/2015 | Dalcher | |
| 2015/0106656 | A1* | 4/2015 | Bian | G06F 9/445 714/37 |
| 2015/0178632 | A1 | 6/2015 | Fu et al. | |
| 2015/0339478 | A1 | 11/2015 | Dalcher | |

FOREIGN PATENT DOCUMENTS

| | | |
|---|---|---|
| CN | 103488495 A | 1/2014 |
| CN | 103608768 A | 2/2014 |
| CN | 103646090 A | 3/2014 |
| CN | 103677900 A | 3/2014 |
| CN | 103678342 A | 3/2014 |
| CN | 104572205 A | 4/2015 |

OTHER PUBLICATIONS

Yan et al., Fast app launching for mobile devices using predictive user context, 14 pages (Year: 2012).*
International Search Report in international application No. PCT/CN2016/080552, dated Aug. 2, 2016.
Notice of Allowance of the Chinese application No. 201510295900.8, dated Oct. 8, 2018.
First Office Action of the Chinese application No. 201510295900.8, dated Jul. 23, 2019.
English translation of the Written Opinion of the International Search Authority in the international application No. PCT/CN2016/080552, dated Aug. 2, 2016.

* cited by examiner

METHOD, TERMINAL AND STORAGE MEDIUM FOR STARTING SOFTWARE

CROSS-REFERENCE TO RELATED APPLICATIONS

This is a continuation application of International Patent Application No. PCT/CN2016/080552, filed on Apr. 28, 2016, which claims priority to Chinese Patent Application No. 201510295900.8, filed on Jun. 2, 2015, entitled "Software Starting Method and Device." The disclosures of these applications are incorporated by reference herein in their entirety.

TECHNICAL FIELD

At least some of the embodiments of the disclosure relate to the field of computer technologies, and in particularly, to a method, a terminal and storage medium for starting software.

BACKGROUND

Development of computer technologies has significant influence on people's life and work. People may install various kinds of software, such as a stand-alone game, an online game, instant messaging or works designing, on computers or mobile terminals to realize various kinds of functions. Software, when being used, will be started to further enter an operable stage. Time, called starting time, will be spent on a process from the starting stage to the operable stage of the software. The starting time varies from software to software. The starting time of some pieces of software such as a large game or engineering design may be a minute or even more. Excessively long starting time can cause difficulties of software in timely responding, which cause low efficiency.

SUMMARY

According to various embodiments of the disclosure, a method, a terminal and storage medium for starting software are provided.

A method for starting software carried out in an electronic apparatus is provided, which may include: configuration information, which is information for configuring a starting acceleration mode adopted for starting target software, is acquired; a starting acceleration level of the target software is determined according to the configuration information; at least one of a number of prefetching operations and number of files prefetched in each prefetching operation corresponding to the determined starting acceleration level is acquired; starting files of the target software are opened and data in the starting files is prefetched into a memory in each prefetching operation according to the at least one of the determined number of prefetching operations and number of files prefetched in each prefetching operation; and the target software is started according to the data prefetched into the memory.

A terminal for starting software is provided, which may include a memory storing instructions and a processor, wherein the instructions may be executed by the processor to cause the processor to execute the steps of: configuration information, which is information for configuring a starting acceleration mode adopted for starting target software, is acquired; a starting acceleration level of target software is determined according to the configuration information; at least one of a number of prefetching operations and number of files prefetched in each prefetching operation corresponding to the determined starting acceleration level is acquired; starting files of the target software are opened and data in the starting files is prefetched into a memory in each prefetching operation according to the at least one of the determined number of prefetching operations and number of files prefetched in each prefetching operation; and the target software is started according to the data prefetched into the memory.

Non-volatile computer-readable storage media or medium storing computer-executable instructions are provided, the computer-executable instructions, when being executed by one or more processors, may cause the one or more processors to execute the steps of: configuration information, which is information for configuring a starting acceleration mode adopted for starting target software, is acquired; a starting acceleration level of target software is determined according to the configuration information; at least one of a number of prefetching operations and number of files prefetched in each prefetching operation corresponding to the determined starting acceleration level is acquired; starting files of the target software are opened and data in the starting files is prefetched into a memory in each prefetching operation according to the at least one of the determined number of prefetching operations and number of files prefetched in each prefetching operation; and the target software is started according to the data prefetched into the memory.

Details of one or more embodiments of the disclosure are presented in the following drawings and descriptions. Other characteristics, purposes and advantages of the embodiments of the disclosure will become apparent from the specification, the drawings and the claims.

BRIEF DESCRIPTION OF DRAWINGS

In order to describe the technical solutions of embodiments of the disclosure or a conventional art more clearly, the drawings used for descriptions about the embodiments or the conventional art will be simply introduced. It is apparent that the drawings used for the descriptions below are only some embodiments of the disclosure. Those skilled in the art can also obtain other drawings according to these drawings without creative work.

DETAILED DESCRIPTION

In order to make a purpose, technical solutions and advantages of the disclosure clearer, the disclosure will be further described below with reference to the drawings and embodiments in detail. It is to be understood that the specific embodiments described herein are only adopted to explain the disclosure and not intended to limit the disclosure.

A Windows operating system provides a kernel function MmPrefetchPages, called a system prefetching function, for prefetching files. The data in the file may be prefetched into a memory by using the system prefetching function. In the embodiments of the disclosure, starting acceleration modes each having a different starting acceleration level are created on the basis of the system prefetching function. As such, starting acceleration mode applicable to each of different application scenarios is adopted to accelerate starting of target software in the application scenario, and starting time of the target software can be reduced.

Figure 1:
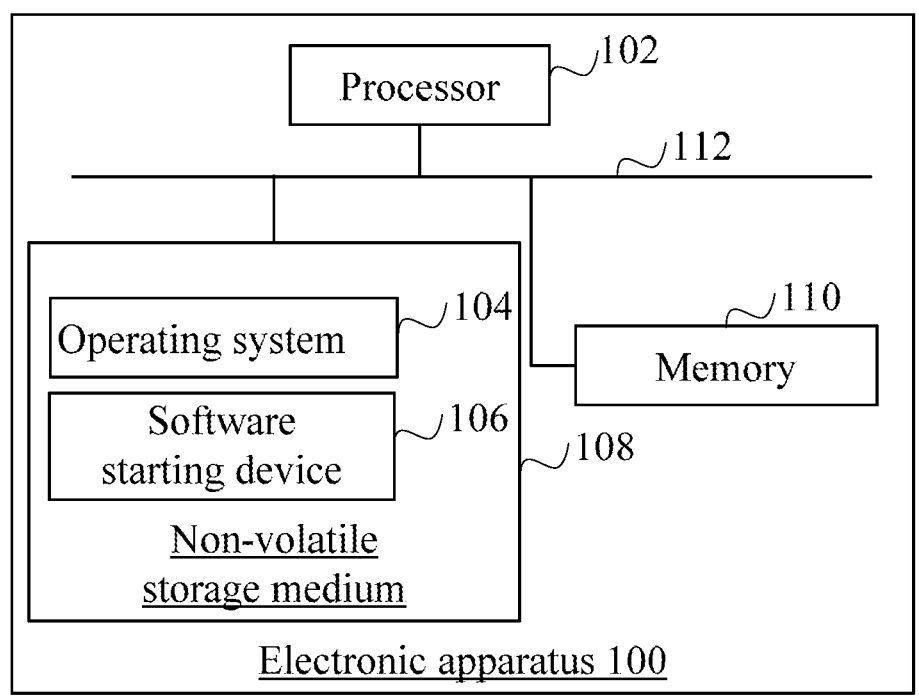
FIG. 1 is a diagram of a structure of an electronic apparatus configured to implement a method for starting software according to an embodiment.

As shown in FIG. 1, in an embodiment, an electronic apparatus 100 is provided. The electronic apparatus 100 includes a processor 102, non-volatile storage medium 108 and memory 110 connected through a system bus 112. The processor 102 has a calculation function and a function of controlling the operations of the whole electronic apparatus 100. The processor 102 is configured to execute a method for starting software. The non-volatile storage medium 106 may include various storage medium such a magnetic storage medium, an optical storage medium or a flash storage medium. The non-volatile storage medium stores an operating system 104 and a software starting device 106. The software starting device 1065 is configured to implement the method for starting software. The memory 110 is configured to provide a high-speed cache for the operating system 104 and the software starting device 106. The electronic apparatus 100 may be a desktop computer or a mobile terminal. The mobile terminal may be various mobile terminals such as a mobile phone and a tablet.

Figure 2:
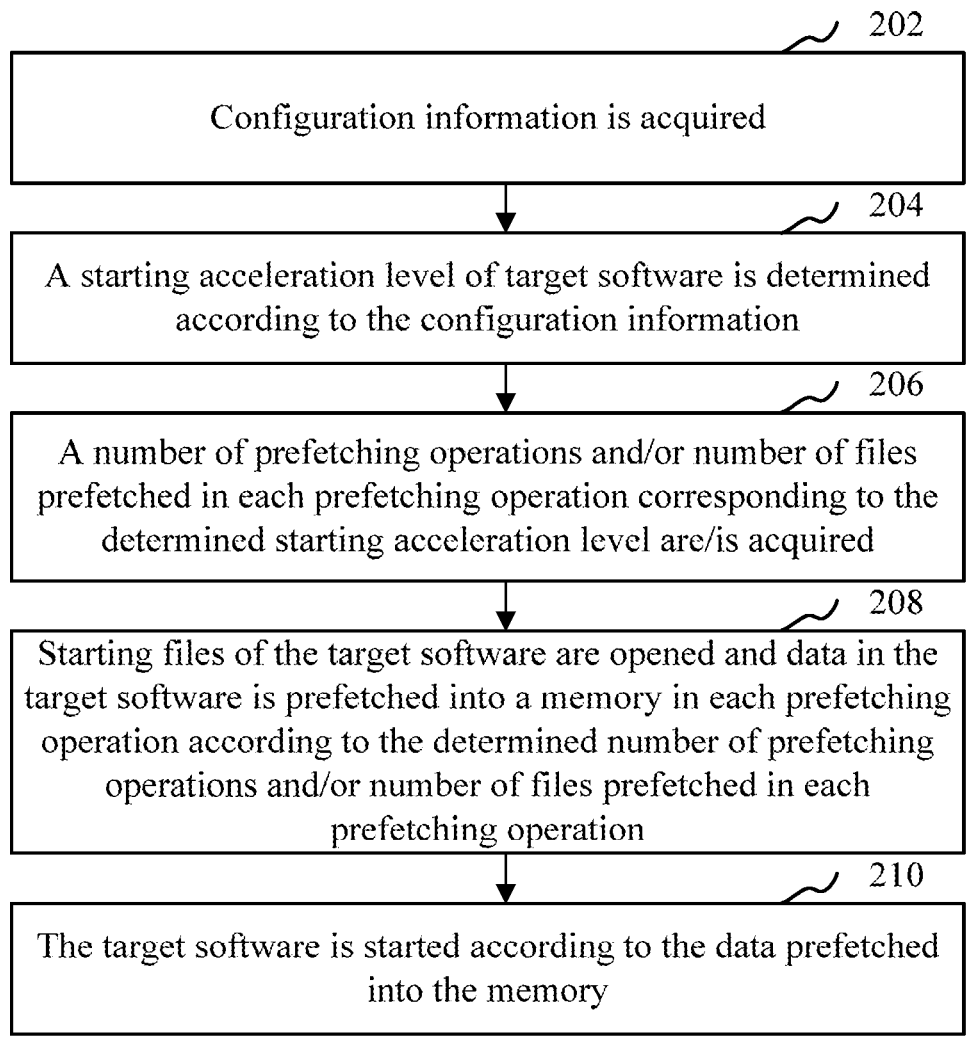
FIG. 2 is a flowchart of a method for starting software according to an embodiment.

As shown in FIG. 2, in an embodiment, a method for starting software is provided. In the embodiment, descriptions are made with application of the method to electronic apparatus 100 in FIG. 1 as an example. For example, the steps as shown in FIG. 2 may be carried out by the electronic apparatus in FIG. 1. The method specifically includes the following steps.

In Step 202, configuration information is acquired.

Specifically, the configuration information is information for configuring a starting acceleration mode adopted for software starting. In an embodiment, Step 202 includes: the configuration information is fetched from a configuration file. A user may customize the configuration file, thereby configuring different starting acceleration modes for different pieces of software. In an embodiment, Step 202 includes: the configuration information is acquired from a server.

In an embodiment, Step 202 includes: the configuration information is acquired through a communication process, and notified to an acceleration driving component. The communication process is configured to communicate with an operating system, the acceleration driving component and a starting process of the target software. The acceleration driving component is configured to implement starting acceleration of the target software.

In Step 204, a starting acceleration level of target software is determined according to the configuration information.

Specifically, the starting acceleration level may be divided as demand, thereby configuring different starting acceleration levels for different pieces of software. The target software refers to software requiring starting acceleration. The target software may be any piece of software, including: game software, communication software, engineering design software, image processing software, programming software and the like.

In an embodiment, the starting acceleration level includes: a low acceleration level, a medium acceleration level and a high acceleration level. In an embodiment, the configuration information includes a corresponding relationship between a software identifier and a starting acceleration level, so that the starting acceleration level of the target software may be found according to the corresponding relationship. In an embodiment, the configuration information includes a corresponding relationship between a software identifier and an acceleration window identifier, so that Step 204 or Step 206 may be executed according to the corresponding relationship when a specified window of the target software appears.

In an embodiment, Step 204 includes: the starting acceleration level of the target software is determined by the acceleration driving component according to the configuration information.

In Step 206, a number of prefetching operations and/or number of files prefetched in each prefetching operation corresponding to the determined starting acceleration level are/is acquired.

Prefetching is a technology for increasing starting speed of a process of a program, by which a main content of the target software is fetched to avoid high time consumption in fetching data of the software when the software is started. A process of opening a starting file of the target software and prefetching data in the opened starting file is called a prefetching operation. The number of prefetching operations refers to a number of times for which the process of opening the starting file of the target software and prefetching the data in the opened starting file is required to be performed when the corresponding target software is started. The number of files prefetched in each prefetching operation refers to a number of starting files required to be opened and prefetched when the process of opening the starting file of the target software and prefetching the data in the opened starting file is performed when the target software is started.

In an embodiment, Step 206 includes: the number of prefetching operations and/or number of files prefetched in each prefetching operation corresponding to the determined starting acceleration level are/is acquired by the acceleration driving component.

In Step 208, starting files of the target software are opened and data in the starting files is prefetched into a memory in each prefetching operation according to the determined number of prefetching operations and/or number of files prefetched in each prefetching operation.

Specifically, whether the starting files of the target software will be opened once or for many times to call a system prefetching function for performing a prefetching operation may be determined according to the determined number of prefetching operations and/or number of files prefetched in each prefetching operation. If the number of prefetching operations is small, many starting files will be opened in each prefetching operation, which may cause a large number of concurrent file fetching operations but achieve an apparent starting acceleration effect. If the number of prefetching operations is large, few starting files will be opened in each prefetching operation, so that a relatively poor starting acceleration effect is achieved although there are few concurrent file fetching operations. The starting files refer to files required for the starting of the target software.

The electronic apparatus 100 may call a system function ZwOpenFile, for opening files, of the Windows operating system to open the starting files, call a system function ZwCreateSection for creating a shared memory section to create the shared memory section, and calculate information of page blocks of the starting files to be prefetched to implement initialization of the starting files to be prefetched. The information of the page block includes a page block size and a file offset attribute. After the starting files to be prefetched are initialized, the system prefetching function MmPrefetchPages may be called to prefetch the data in the opened starting files into the memory.

In an embodiment, file prefetching interfaces corresponding to the respective starting acceleration levels may be encapsulated according to the system prefetching function. Each of the file prefetching interfaces realizes, in each prefetching operation, a function of opening the starting files of the target software and prefetching the data in the starting files into the memory according to the determined number of prefetching operations and/or number of files prefetched in each prefetching operation. Therefore, only the file prefetching interface corresponding to the determined starting acceleration level will be called to process the starting files of the target software.

In an embodiment, Step 208 includes: the starting files of the target software are opened in each prefetching operation by the acceleration driving component according to the determined number of prefetching operations and/or number of files prefetched in each prefetching operation, and the data is prefetched into the memory.

In Step 210, the target software is started according to the data prefetched into the memory.

Specifically, the data prefetched into the memory can be rapidly called. Here, starting the target software according to the data prefetched into the memory may implement accelerated starting of the target software.

According to the method for starting software, different starting acceleration levels may be divided in advance, and the starting acceleration level of the target software may be determined according to the configuration information. Whether the starting files of the target software will be opened once or for many times is determined according to the number of prefetching operations and/or number of files prefetched in each prefetching operation corresponding to the starting acceleration level, thereby prefetching the data in the opened starting files into the memory. In such a manner, by prefetching the starting files of the target software, the starting speed of the target software can be significantly increased, and the starting time can be reduced. Moreover, the number of times for which the starting files are opened may be flexibly regulated by regulating the number of prefetching operations and/or number of files prefetched in each prefetching operation corresponding to each starting acceleration level. As such, a number of file fetching operations in each prefetching operation can be controlled, and applicability to different starting acceleration requirements of various kinds of software and high compatibility can be achieved.

In an embodiment, the determined starting acceleration level is a first starting acceleration level. In such case, Step 208 includes: all the starting files of the target software are opened, and then the data in all the opened starting files is prefetched into the memory.

Specifically, the first starting acceleration level corresponds to a high starting acceleration level. In the embodiment, all the starting files of the target software are initialized simultaneously, and then a system prefetching function MmPrefetchPages is called simultaneously to prefetch the data in the opened starting files into the memory. The first starting acceleration level has an apparent acceleration effect mainly on some target software which is very time-consuming and has many starting files.

In the embodiment, all the starting files of the target software are opened and prefetched simultaneously, so that the acceleration of the starting of the target software can be implemented maximally in a prefetching manner.

In an embodiment, before the step that the data is prefetched in all the opened starting files into the memory after all the starting files of the target software are opened, the method further includes: a starting process of the target software is suspended. And after all the starting files of the target software are opened and then the data in all the opened starting files is prefetched into the memory, the method further includes: the starting process is resumed.

Specifically, the high starting acceleration level may implement starting acceleration of the target software maximally in the prefetching manner, but may also instantaneously cause many concurrent file fetching operations while the starting process of the target software may also cause many file fetching operations, leading to fluctuations of magnetic disk due to fetching offset, and causing significant reduction in efficiency of file fetching. Therefore, in the case of the first starting acceleration level, it is necessary here to suspend the starting process of the target software, thereby avoiding the starting process of the target software and a starting acceleration mechanism simultaneously initiating file fetching operations to cause influence on the starting speed of the target software and influence on the starting acceleration effect. By contrast, file fetching operations initiated during starting acceleration in the case of the other starting acceleration levels are relatively mild, and intervention may not performed on the starting process.

In an embodiment, a time point when the starting process is resumed may be determined according to the configuration information, thereby resuming the starting process at the time point. The time point may be a time point after a preset time length from beginning of the starting process, or a time point after a preset time length from beginning of suspending of the starting process, or a time point when a specified event happens.

In an embodiment, the step that the starting process of the target software is suspended includes: a custom function registered in the operating system receives a first notice sent by a system callback function interface when starting the starting process of the target software and awaits. The step that the starting process is resumed includes: the custom function feeds back a second notice to the system callback function interface to cause the operating system to continue running the starting process.

Specifically, in order to implement suspending of the starting process of the target software, a synchronization characteristic of the system callback function interface PsSetCreateProcessNotifyRoutine of the operating system is utilized. That is, a subsequent operation may be continued only after the system callback function interface sends a message and receives a feedback to the message. In the embodiment, the custom function is registered in the operating system in advance, and then the custom function may be called by the system callback function interface. In such a manner, when the operating system starts the starting process of the target software, the custom function is called by the system callback function interface. Then the custom function may receive the first notice, and for implementing the suspending of the starting process, the custom is only required to await. Furthermore, the custom function feeds back the second notice to the system callback function interface, so that the operating system continues running the starting process to resume of the starting process.

In an embodiment, the determined starting acceleration level is a second starting acceleration level. In such case, Step 208 includes: a step that a first number of starting files of the target software are opened and data in the starting files opened in each prefetching operation is prefetched into the memory is repeatedly executed until the data of all the starting files of the target software is prefetched into the memory, wherein the first number equals to the number of files prefetched in each prefetching operation.

The second starting acceleration level corresponds to a medium starting acceleration level. The second starting acceleration level is a dynamically configurable starting acceleration level. The configuration information may specifically include the number of files prefetched in each prefetching operation, so that the number of prefetching operations for the second starting acceleration level is controllable.

Specifically, the electronic apparatus 100 may perform a plurality of prefetching operations to open the starting files of the target software and prefetch the data in the starting files. In each prefetching operation, a first number of starting files are opened, wherein the first number equals to number of files prefetched in each prefetching operation, and then the system prefetching function MmPrefetchPages is called once to prefetch these opened starting files, a first number of other starting files are opened and the system prefetching function MmPrefetchPages is called once to prefetch these opened starting files. Such operations are repeated, until the data of all the starting files of the target software is prefetched into the memory. The number of prefetching operations is the same as a number of times for which the system prefetching function is called.

For example, if the starting acceleration level, which is corresponding to the target software, in the configuration information is the second starting acceleration level, the corresponding number of files prefetched in each prefetching operation is 50 and a total number of the starting files of the target software is 100, the corresponding number of prefetching operations is 2 which indicates that the system prefetching function will be called twice. Specifically, when the target software is started, at first, 50 starting files are opened and the system prefetching function is called once to prefetch data into the memory. Then the other 50 starting files are opened, and the system prefetching function is called again to prefetch data into the memory.

In an embodiment, the determined starting acceleration level is a third starting acceleration level. In such case, Step 208 includes: a step that a starting file of the target software is opened and data in the opened starting file is prefetched into the memory is repeatedly executed, until the data in all the starting files of the target software is prefetched into the memory.

Specifically, the third starting acceleration level corresponds to a low starting acceleration level. In the embodiment, in each prefetching operation, only one starting file is opened and prefetched. Specifically, every time when a starting file of the target software is initialized, the system prefetching function MmPrefetchPages is called once to prefetch the data in the opened starting file into the memory.

The third starting acceleration level is applicable to accelerate the starting of the target software of which starting time is relatively short.

For example, it is assumed that the target software has 100 starting files and the starting acceleration level which is corresponding to the target software, in the configuration information is the third starting acceleration level. In such case, when the target software is started, at first, one starting file is opened and the system prefetching function is called once to prefetch data into the memory. Then another un-prefetched starting file is opened and the system prefetching function is called again to prefetch data into the memory. Such operations are repeatedly executed, until data of each of the 100 starting files is prefetched into the memory.

In the embodiment, prefetching only one starting file of the target software every time to implement starting acceleration of the target software can avoid concurrency of a large number of file fetching operations and can also implement starting acceleration of multiple pieces of target software at the same time.

In an embodiment, the method for starting software further includes: the data is fetched from the starting files of the target software through the starting process of the target software. In such case, Step 210 includes: the target software is started according to the data fetched by the starting process and the data prefetched into the memory.

Specifically, the embodiment is mainly applied to the situations of the second starting acceleration level and the third starting acceleration level. The file fetching operations initiated in the case of the two starting acceleration levels are relatively mild, such that the starting process of the target software may fetch the data from the starting files of the target software while starting acceleration is implemented. Furthermore, when the starting process starts the target software, starting is performed according to the data fetched by the starting process and the data prefetched into the memory. Therefore, the starting speed can further be increased, and the starting time can be reduced.

In an embodiment, Step 204 includes: division of starting stages of the target software is determined according to the configuration information, and starting acceleration level of each of the starting stages are determined. In such case, Step 208 includes: in each starting stage, the starting files of the target software are opened and the data in the starting files is prefetched into the memory in each prefetching operation by adopting a number of prefetching operations and/or number of files prefetched in each prefetching operation corresponding to the starting acceleration level of the starting stage.

Specifically, the stating process of the target software may be divided differently according to a characteristic of the target software. For example, for online game software, a starting process may be divided into a login stage, and a starting stage for entering a game interface. In another example, for application software, a starting process may be divided into a registration stage and a starting stage for entering an application interface. Examples are not exhaustive herein. The configuration information may include division of starting stages of the target software. For example, the configuration information may include window identifier of each of target starting stages, so that when the corresponding window appears, it is indicated that a corresponding starting stage will be entered.

For example, for multiplayer online game software, a starting process includes two stages, i.e., a login stage and a starting stage for entering a game interface. The login stage requires few starting files to be fetched and consumes less time, and thus a starting acceleration means of the third starting acceleration level may be adopted for acceleration. In such case, about 10% of starting files may be prefetched without influence on time of the login stage. The starting stage for entering the game interface consumes relatively more time, about 60 seconds, before acceleration. In such case, a starting acceleration means of the first starting acceleration level may be adopted for acceleration in the starting stage, about the other 90% of the starting files may be prefetched in the starting stage, and the starting stage requires only about 30 seconds after starting acceleration.

In the embodiment, the starting process of the target software is divided into different starting stages. Then starting acceleration means of the most proper starting acceleration level is adopted in each starting stage depending on situations, so that starting acceleration of the target software is more flexible and efficient.

Figure 3:
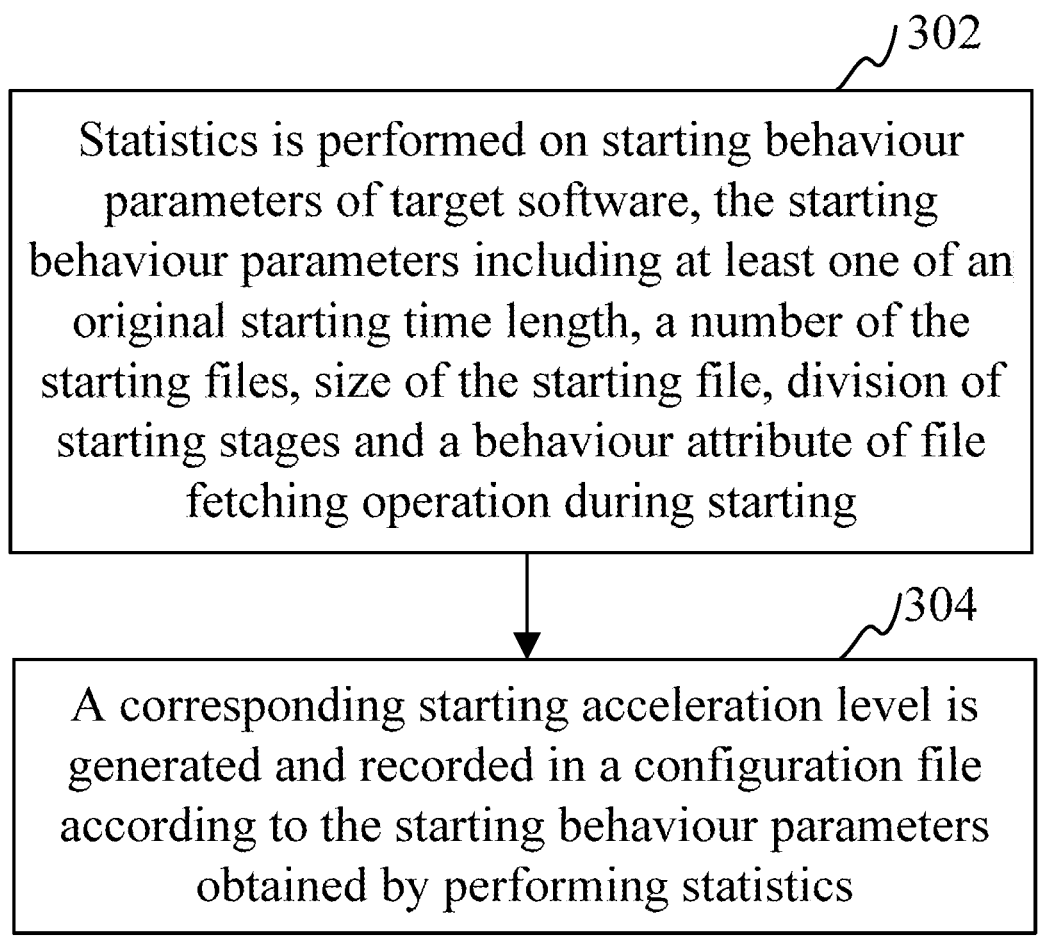
FIG. 3 is a flowchart of steps of generating a configuration file according to an embodiment.

As shown in FIG. 3, in an embodiment, the method for starting software further includes a step that the configuration file is generated. Specifically, the method includes the following steps.

In Step 302, statistics is performed on starting behaviour parameters of the target software. The starting behaviour parameters include at least one of an original starting time length, a number of the starting files, size of the starting file, division of starting stages and a behaviour attribute of file fetching operation during starting.

Specifically, the starting behaviour parameters refer to parameters representing characteristics of the target software during starting. The original starting time length refers to a time length required for starting of the target software without adopting any starting acceleration means. The number of the starting files refers to a total number of starting files required for starting of the target software. The starting file size includes size of each of the starting files and an average of the sizes of the respective starting files. The behaviour attribute of file fetching operation during starting includes a number of file fetching operations initiated during starting of the target software, time distribution of the file fetching operations and the like.

In Step 304, a corresponding starting acceleration level is generated and recorded into the configuration file according to the starting behaviour parameters obtained by performing statistics. Moreover, Step 202 specifically includes: the configuration information is fetched from the configuration file.

Specifically, the starting behaviour parameters, which are obtained by performing statistics, of the target software may reflect a starting acceleration requirement of the target software. As such, the corresponding starting acceleration level can be generated according to the starting behaviour parameters obtained by performing statistics, and in correspondence to a software identifier of the target software, the starting acceleration level is recorded into the configuration file.

For example, the first starting acceleration level may be adopted for target software with a relatively large original starting time length, while the second or third starting acceleration level may be adopted for target software with a relatively small original starting time length. The first starting acceleration level may be adopted for target software with a large number of starting files or with large starting files, while the second or third starting acceleration level may be adopted for target software with a small number of starting files or with small starting files. The starting acceleration level may be configured for each of the starting stages according to division of starting stages. The first starting acceleration level may be adopted for target software with a relatively large number of file fetching operations, and the second or third starting acceleration level may be adopted for target software with a relatively small number of file fetching operations.

In the embodiment, the statistics is performed on the starting behaviour parameters of the target software, and the corresponding starting acceleration level is generated according to the starting behaviour parameters and recorded into the configuration file. As such, a starting acceleration strategy can be flexibly configured according to starting behaviour characteristics of the target software, and higher flexibility and efficiency of starting acceleration can be ensured.

In an embodiment, the method for starting software further includes: a starting acceleration result is reported to a server after a notice indicating that starting of the target software is ended is acquired. The starting acceleration result includes at least one of whether starting acceleration succeeds, whether all the starting files of the target software have been prefetched and a number of the prefetched starting files.

Specifically, the notice indicating that starting of the target software is ended may be a notice indicating that the target software is successfully started or a notice indicating that the target software is failed to be started. The notice indicating that starting of the target software is ended may be received by the communication process from the acceleration driving component. The starting acceleration result is reported to the server, and the server may make further analysis and improvement according to the reported starting acceleration result, thereby feeding back preferred configuration information.

Specifically, in case of a starting acceleration failure, the starting acceleration level which is corresponding to the target software, in the configuration information may be modified. If not all the starting files of the target software can be prefetched, a configuration, about whether to suspend the process, which is corresponding to the target software, in the configuration information may be modified. If the number of the prefetched starting files is relatively small and the starting acceleration level corresponding to the target software is the first starting acceleration level, the first starting acceleration level which is corresponding to the target software, in the configuration information may be modified into the second or third starting acceleration level.

Figure 4A:
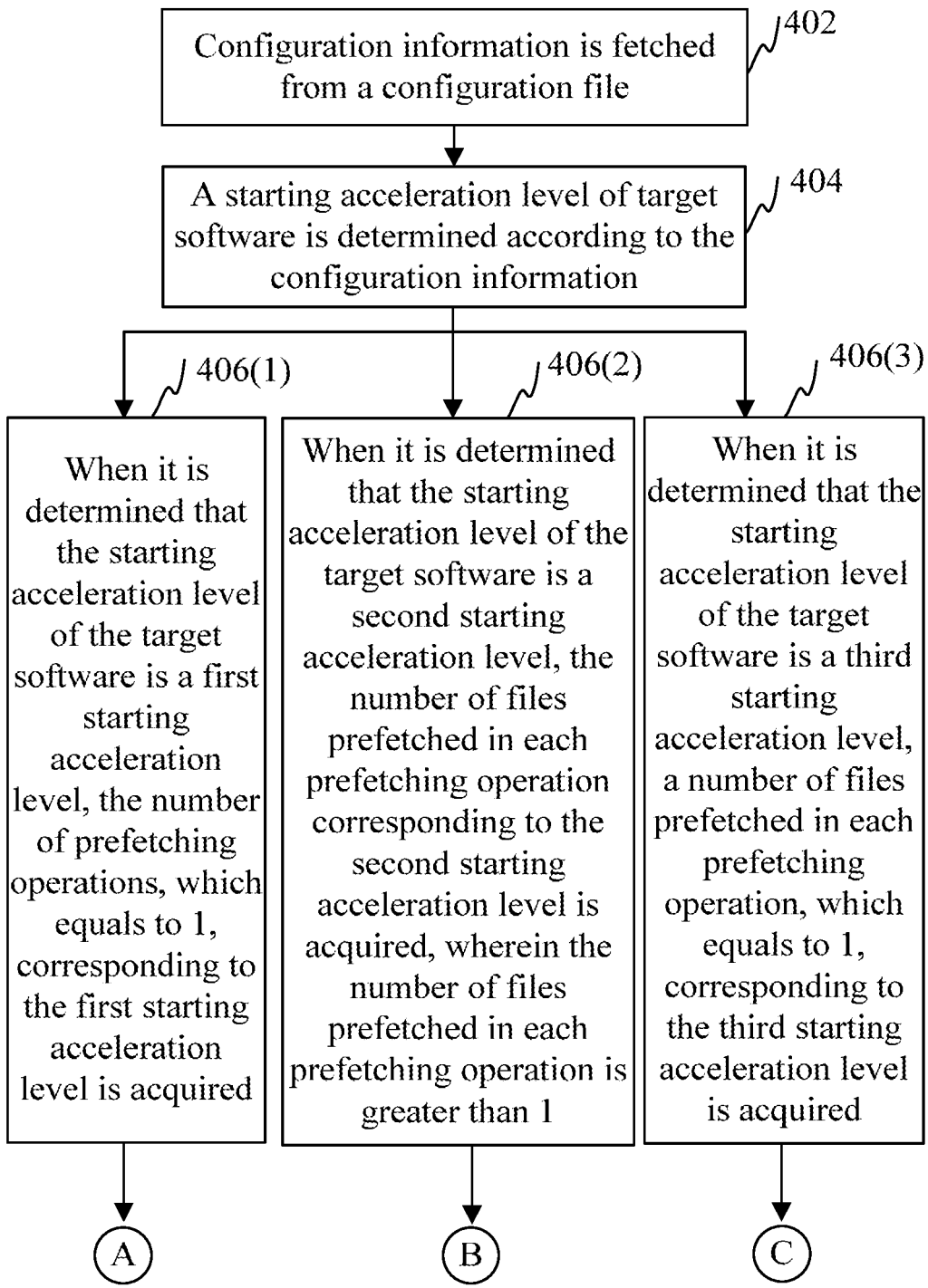
FIG. 4A illustrates a first portion of a flowchart of a method for starting software according to another embodiment.
Figure 4B:
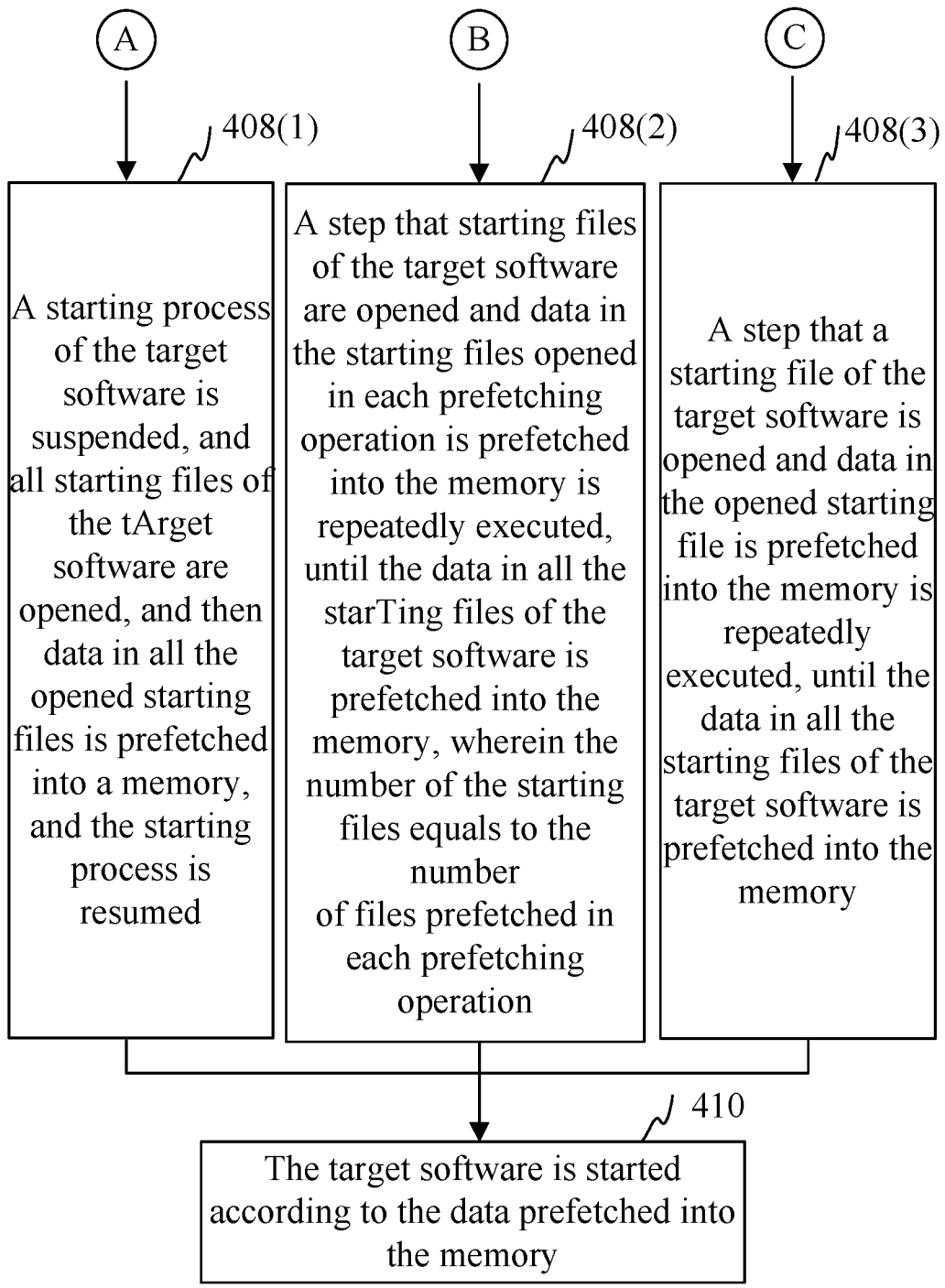
FIG. 4B illustrates a second portion of the flowchart of the method for starting software.

As shown in FIG. 4A and FIG. 4B, in an embodiment, a method for starting software specifically includes the following steps.

Step 402: configuration information is fetched from a configuration file.

Figure 5:
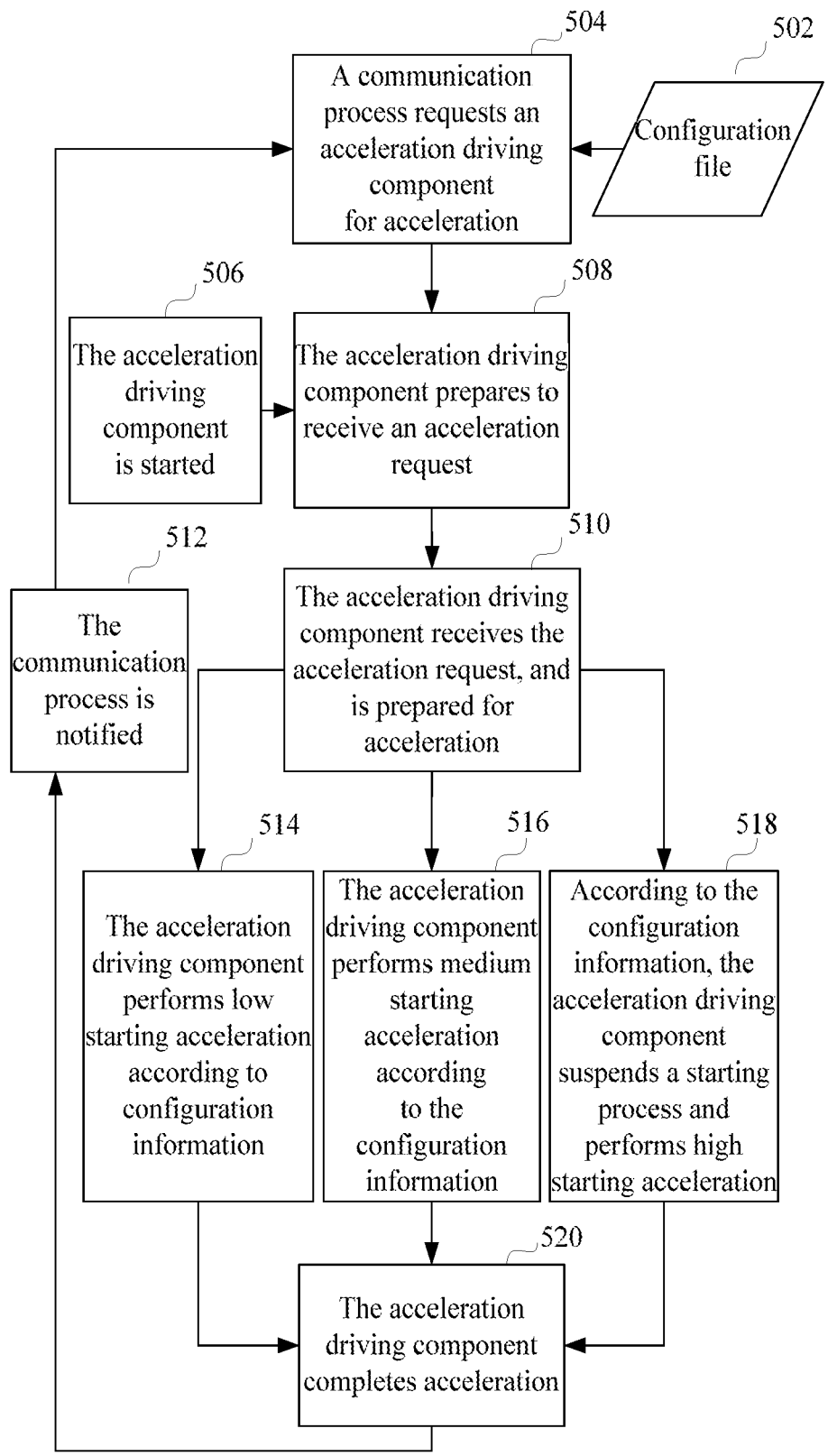
FIG. 5 is a flowchart of a method for starting software according to yet another embodiment.

Specifically, referring to FIG. 5, electronic apparatus 100 runs a communication process and an acceleration driving component in block 506. The electronic apparatus 100 acquires the configuration information 502 and sends the acceleration request to the acceleration driving component through the communication process in the block 504. The communication process is configured to fetch a related content in the configuration file and then communicate with the acceleration driving component, for example, controlling a file prefetching interface adopted by the acceleration driving process and whether to suspend the process. The acceleration driving component is started in block 506 and the acceleration driving component prepares to receive an acceleration request from the communication process in block 508.

In Step 404: a starting acceleration level of target software is determined according to the configuration information.

Specifically, referring to FIG. 5, in block 510, the electronic apparatus 100 may receive the acceleration request from the communication process by the acceleration driving component, and the acceleration driving component determines the starting acceleration level of the target software according to the acceleration request, and selects a corresponding file prefetching interface for starting acceleration, for example, the acceleration operation shown in blocks 514 and 516.

In Step 406 (1): if it is determined that the starting acceleration level of the target software is a first starting acceleration level, the number of prefetching operations, which equals to 1, corresponding to the first starting acceleration level is acquired.

In Step 406 (2): if it is determined that the starting acceleration level of the target software is a second starting acceleration level, a number of files prefetched in each prefetching operation corresponding to the second starting acceleration level is acquired, the number of files prefetched in each prefetching operation is greater than 1.

In Step 406 (3): if it is determined that the starting acceleration level of the target software is a third starting acceleration level, a number of files prefetched in each prefetching operation 1 corresponding to the third starting acceleration level is acquired.

In Step 408 (1): a starting process of the target software is suspended, and after all starting files of the target software are opened, data in all the opened starting files is prefetched into a memory, and the starting process is resumed.

Specifically, a custom function registered in an operating system may receive a first notice sent by a system callback function interface when starting the starting process of the target software, and await so as to implement suspending of the starting process of the target software. The custom function feeds back a second notice to the system callback function interface to cause the operating system to continue running the starting process to resume the suspended starting process.

In Step 408 (2): a step that starting files, in a number which is the number of files prefetched in each prefetching operation, of the target software are opened and data in the starting files opened in each prefetching operation is prefetched into the memory is repeatedly executed, until the data in all the starting files of the target software is prefetched into the memory.

In Step 408 (3): a step that a starting file of the target software is opened and data in the opened starting file is prefetched into the memory is repeatedly executed, until the data in all the starting files of the target software is prefetched into the memory.

In Step 410: the target software is started according to the data prefetched into the memory.

Figure 6:
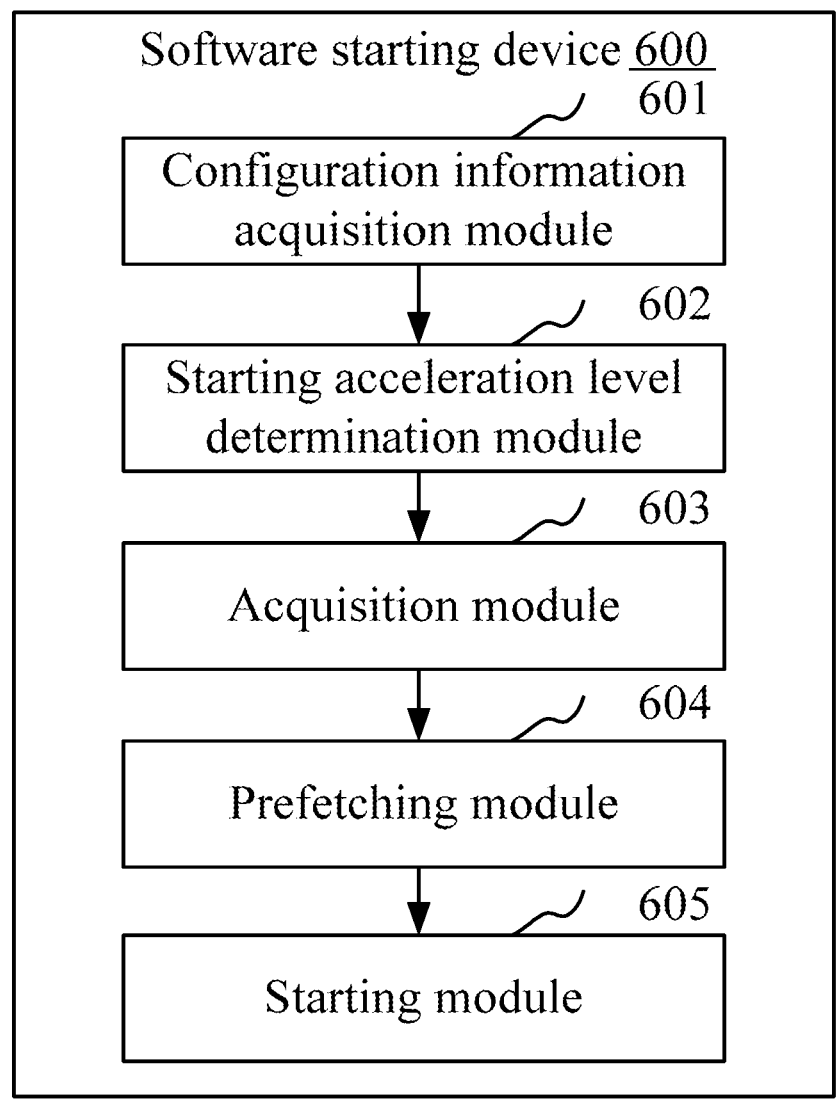
FIG. 6 is a block diagram of a structure of a software starting device according to an embodiment.

As shown in FIG. 6, in an embodiment, a software starting device 600 is provided, which has function modules for implementing the method for starting software according to the abovementioned embodiments. The software starting device 600 includes a configuration information acquisition module 601, starting acceleration level determination module 602, acquisition module 603, prefetching module 604 and starting module 605.

The configuration information acquisition module 601 is configured to acquire configuration information.

Specifically, the configuration information is information for configuring a starting acceleration mode adopted for software starting. In an embodiment, the configuration information acquisition module 601 is configured to fetch the configuration information from a configuration file. A user may customize the configuration file, thereby configuring different starting acceleration modes for different pieces of software. In an embodiment, the configuration information acquisition module 601 is configured to acquire the configuration information from a server.

In an embodiment, the configuration information acquisition module 601 is configured to acquire the configuration information through a communication process, and notify an acceleration driving component. The communication process is configured to communicate with an operating system, the acceleration driving component and a starting process of the target software. The acceleration driving component is configured to implement starting acceleration of the target software.

The starting acceleration level determination module 602 is configured to determine a starting acceleration level of target software according to the configuration information.

Specifically, the starting acceleration level may be divided as demand, thereby configuring different starting acceleration levels for different pieces of software. The target software refers to software requiring starting acceleration. The target software may be any piece of software, including: game software, communication software, engineering design software, image processing software, programming software and the like.

In an embodiment, the starting acceleration level includes: a low acceleration level, a medium acceleration level and a high acceleration level. In an embodiment, the configuration information includes a corresponding relationship between a software identifier and a starting acceleration level, so that the starting acceleration level of the target software may be found according to the corresponding relationship. In an embodiment, the configuration information includes a corresponding relationship between a software identifier and an acceleration window identifier, so that a notice acquisition module 603 or a prefetching module 604 may be notified of the appearance of the specified window of the target software according to the corresponding relationship when the specified window of the target software appears.

In an embodiment, the starting acceleration level determination module 602 is configured to determine the starting acceleration level of the target software by the acceleration driving component according to the configuration information.

The acquisition module 603 is configured to acquire a number of prefetching operations and/or number of files prefetched in each prefetching operation corresponding to the determined starting acceleration level.

Prefetching is a technology for increasing starting speed of a process of a program, by which a main content of the target software is fetched to avoid high time consumption in fetching data of the software when the software is started. A process of opening a starting file of the target software and prefetching data in the opened starting file is called a prefetching operation. The number of prefetching operations refers to a number of times for which the process of opening the starting file of the target software and prefetching the data in the opened starting file is required to be performed when the corresponding target software is started. The number of files prefetched in each prefetching operation refers to a number of starting files required to be opened and prefetched when the process of opening the starting file of the target software and prefetching the data in the opened starting file is performed when the corresponding target software is started.

In an embodiment, the acquisition module 603 is configured to acquire the number of prefetching operations and/or number of files prefetched in each prefetching operation corresponding to the determined starting acceleration level through the acceleration driving component.

The prefetching module 604 is configured to open starting files of the target software and prefetch data in the starting files into a memory in each prefetching operation according to the determined number of prefetching operations and/or number of files prefetched in each prefetching operation.

Specifically, whether the starting files of the target software will be opened once or for many times to call a system prefetching function for performing a prefetching operation may be determined according to the determined number of prefetching operations and/or number of files prefetched in each prefetching operation. If the number of prefetching operations is small, many starting files will be opened in each prefetching operation, which may cause a large number of concurrent file fetching operations but achieve an apparent starting acceleration effect. If the number of prefetching operations is large, few starting files will be opened in each prefetching operation, so that a relatively poor starting acceleration effect is achieved although there are few concurrent file fetching operations. The starting files refer to files required for the starting of the target software.

The prefetching module 604 may be configured to call a system function ZwOpenFile, for opening files, of the Windows operating system to open the starting files, call a system function ZwCreateSection for creating a shared memory section to create the shared memory section, and calculate information of page blocks of the starting files to be prefetched to implement initialization of the starting files to be prefetched. The information of the page block includes a page block size and a file offset attribute. After the starting files to be prefetched are initialized, the system prefetching function MmPrefetchPages may be called to prefetch the data in the opened starting files into the memory.

In an embodiment, a file prefetching interface corresponding to each starting acceleration level may be encapsulated according to the system prefetching function, and each file prefetching interface realizes a function of opening the starting files of the target software and prefetching the data into the memory in each prefetching operation according to the determined number of prefetching operations and/or number of files prefetched in each prefetching operation. Therefore, only the file prefetching interface corresponding to the determined starting acceleration level will be called to process the starting files of the target software.

In an embodiment, the prefetching module 604 is configured to open the starting files of the target software and prefetch the data in the starting files into the memory in each prefetching operation by the acceleration driving component according to the determined number of prefetching operations and/or number of files prefetched in each prefetching operation.

A starting module 605 is configured to start the target software according to the data prefetched into the memory.

Specifically, the data prefetched into the memory may be rapidly called. Here, starting the target software according to the data prefetched into the memory may implement accelerated starting of the target software.

In an embodiment, the determined starting acceleration level is a first starting acceleration level. In such case, the prefetching module 604 is further configured to open all the starting files of the target software, and then prefetch the data in all the opened starting files into the memory.

Specifically, the first starting acceleration level corresponds to a high starting acceleration level. In the embodiment, the prefetching module 604 is configured to initiated all the starting files of the target software simultaneously, and then call a system prefetching function MmPrefetchPages simultaneously to prefetch the data in the opened starting files into the memory. The first starting acceleration level has an apparent acceleration effect mainly on some target software which is very time-consuming and has many starting files.

In the embodiment, all the starting files of the target software are opened and prefetched simultaneously, so that the acceleration of the starting of the target software can be implemented maximally in a prefetching manner.

Figure 7:
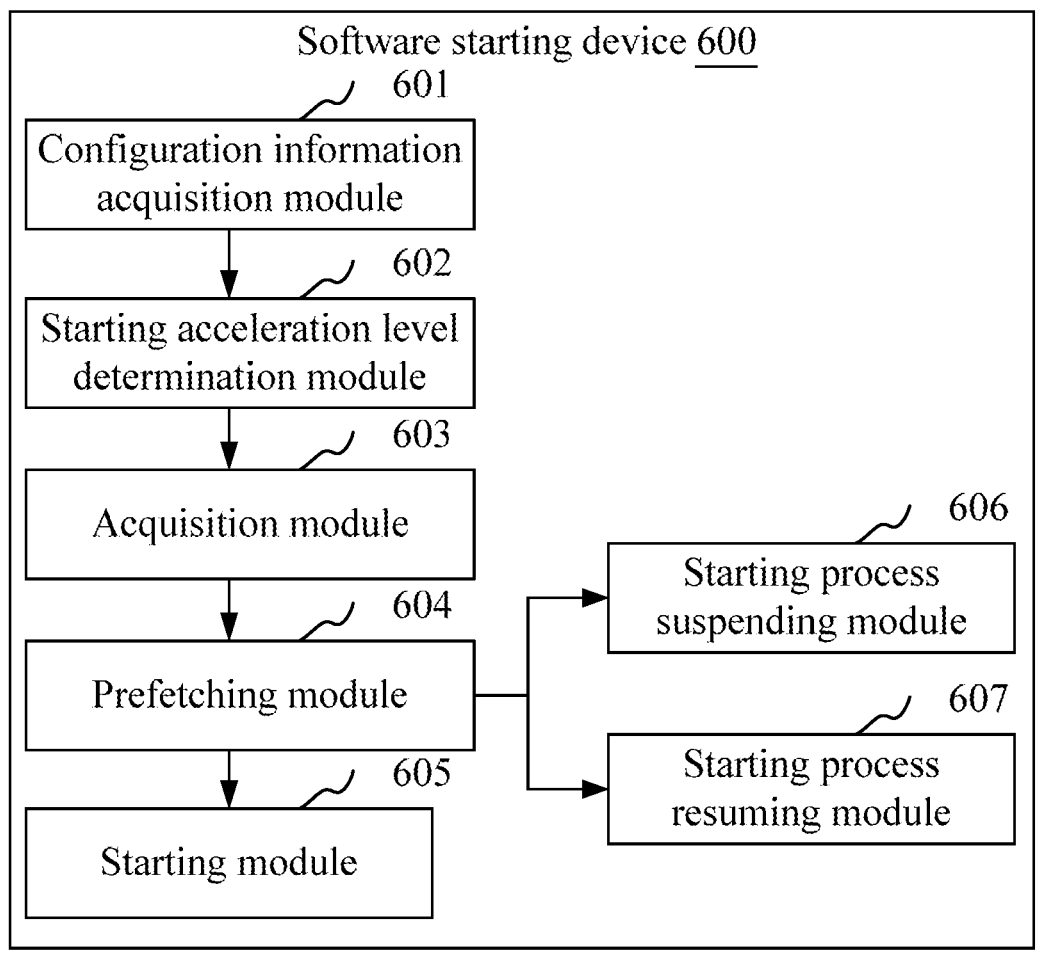
FIG. 7 is a block diagram of a structure of a software starting device according to another embodiment.

As shown in FIG. 7, in an embodiment, the software starting device 600 further includes: a starting process suspending module 606 and a starting process resuming module 607.

The starting process suspending module 606 is configured to, before all the starting files of the target software are opened, suspend a starting process of the target software.

The starting process resuming module 607 is configured to, after the data in all the opened starting files is prefetched into the memory, resume the starting process.

Specifically, the high starting acceleration level may implement starting acceleration of the target software maximally in the prefetching manner, but may also instantaneously cause many concurrent file fetching operations while the starting process of the target software may also cause many file fetching operations, leading to fluctuations of magnetic disk due to fetching offset, and causing significant reduction in efficiency of file fetching. Therefore, in the case of the first starting acceleration level, it is necessary here to suspend the starting process of the target software, thereby avoiding the starting process of the target software and a starting acceleration mechanism simultaneously initiating file fetching operations to cause influence on the starting speed of the target software and influence on the starting acceleration effect. By contrast, file fetching operations initiated during starting acceleration in the case of the other starting acceleration levels are relatively mild, and intervention may not performed on the starting process.

In an embodiment, the starting process resuming module 607 may be configured to determine a time point when the starting process is resumed according to the configuration information, thereby resuming the starting process at the time point. The time point may be a time point after a preset time length from beginning of the starting process, or a time point after a preset time length from beginning of suspending of the starting process, or a time point when a specified event happens.

In an embodiment, the starting process suspending module 606 is further configured to receive a first notice sent by a system callback function interface when starting the starting process of the target software through a custom function registered in the operating system and await.

The starting process resuming module 607 is further configured to feed back a second notice to the system callback function interface to cause the operating system to continue running the starting process through the custom function.

Specifically, in order to implement suspending of the starting process of the target software, a synchronization characteristic of the system callback function interface PsSetCreateProcessNotifyRoutine of the operating system is utilized. That is, a subsequent operation may be continued only after the system callback function interface sends a message and receives a feedback to the message. In the embodiment, the custom function is registered in the operating system in advance, and then the custom function may be called by the system callback function interface. In such a manner, when the operating system starts the starting process of the target software, the custom function is called by the system callback function interface. Then the custom function may receive the first notice, and for implementing the suspending of the starting process, the custom is only required to await. Furthermore, the custom function feeds back the second notice to the system callback function interface, so that the operating system continues running the starting process to resume of the starting process.

In an embodiment, the determined starting acceleration level is a second starting acceleration level. In such case, the prefetching module 604 is further configured to repeatedly execute opening of a first number of starting files of the target software and prefetching of data in the starting files opened in each prefetching operation into the memory, until the data of all the starting files of the target software is prefetched into the memory, wherein the first number equals to the number of files prefetched in each prefetching operation.

The second starting acceleration level corresponds to a medium starting acceleration level. The second starting acceleration level is a dynamically configurable starting acceleration level. The configuration information may specifically include the number of files prefetched in each prefetching operation, so that the number of prefetching operations for the second starting acceleration level is controllable.

Specifically, the prefetching module 604 may be configured to perform a plurality of prefetching operations to open the starting files of the target software and prefetch the data in the starting files. In each prefetching operation, a first number of starting files will be opened, wherein the first number equals to number of files prefetched in each prefetching operation, and then the system prefetching function MmPrefetchPages is called once to prefetch these opened starting files, a first number of other starting files are opened and the system prefetching function MmPrefetchPages is called once to prefetch these opened starting files. Such operations are repeated, until the data of all the starting files of the target software is prefetched into the memory. The number of prefetching operations is the same as a number of times for which the system prefetching function is called.

In an embodiment, the determined starting acceleration level is a third starting acceleration level. In such case, the prefetching module 604 is further configured to repeatedly execute opening of a starting file of the target software and prefetching of data in the opened starting file into the memory, until the data in all the starting files of the target software is prefetched into the memory.

Specifically, the third starting acceleration level corresponds to a low starting acceleration level. In the embodiment, in each prefetching operation, only one starting file is opened and prefetched. Specifically, the prefetching module 604 is configured to, every time when a starting file of the target software is initialized, call the system prefetching function MmPrefetchPages to prefetch the data in the opened starting file into the memory. The third starting acceleration level is applicable to accelerate the starting of the target software of which starting time is relatively short.

In the embodiment, prefetching only one starting file of the target software every time to implement starting acceleration of the target software can avoid concurrency of a large number of file fetching operations and can also implement starting acceleration of multiple pieces of target software at the same time.

In an embodiment, the starting module 605 is further configured to start the target software according to the data prefetched into the memory and the data fetched by the starting process of the target software from the starting file.

Specifically, the embodiment is mainly applied to the situations of the second starting acceleration level and the third starting acceleration level. The file fetching operations initiated in the case of the two starting acceleration levels are relatively mild. The starting process of the target software may fetch the data from the starting files of the target software while starting acceleration is implemented. Furthermore, when the starting process starts the target software, starting is performed according to the data fetched by the starting process and the data prefetched into the memory. Therefore, the starting speed can further be increased, and the starting time can be reduced.

In an embodiment, the starting acceleration level determination module 602 is further configured to determine division of starting stages of the target software according to the configuration information, and determine starting acceleration level of each of the starting stages.

The prefetching module 604 is further configured to, in each starting stage, open the starting files of the target software and prefetch the data in the starting files into the memory in each prefetching operation by adopting a number of prefetching operations and/or number of files prefetched in each prefetching operation corresponding to the starting acceleration level of the starting stage.

Specifically, the stating process of the target software may be divided differently according to a characteristic of the target software. For example, for online game software, a starting process may be divided into a login stage, and a starting stage for entering a game interface. In another example, for application software, a starting process may be divided into a registration stage and a starting stage for entering an application interface. Examples are not exhaustive herein. The configuration information may include division of starting stages of the target software. For example, the configuration information may include window identifier of each of target starting stages, so that when the corresponding window appears, it is indicated that a corresponding starting stage will be entered.

In the embodiment, the starting process of the target software is divided into different starting stages. Then starting acceleration means of the most proper starting acceleration level is adopted in each starting stage depending on situations, so that starting acceleration of the target software is more flexible and efficient.

Figure 8:
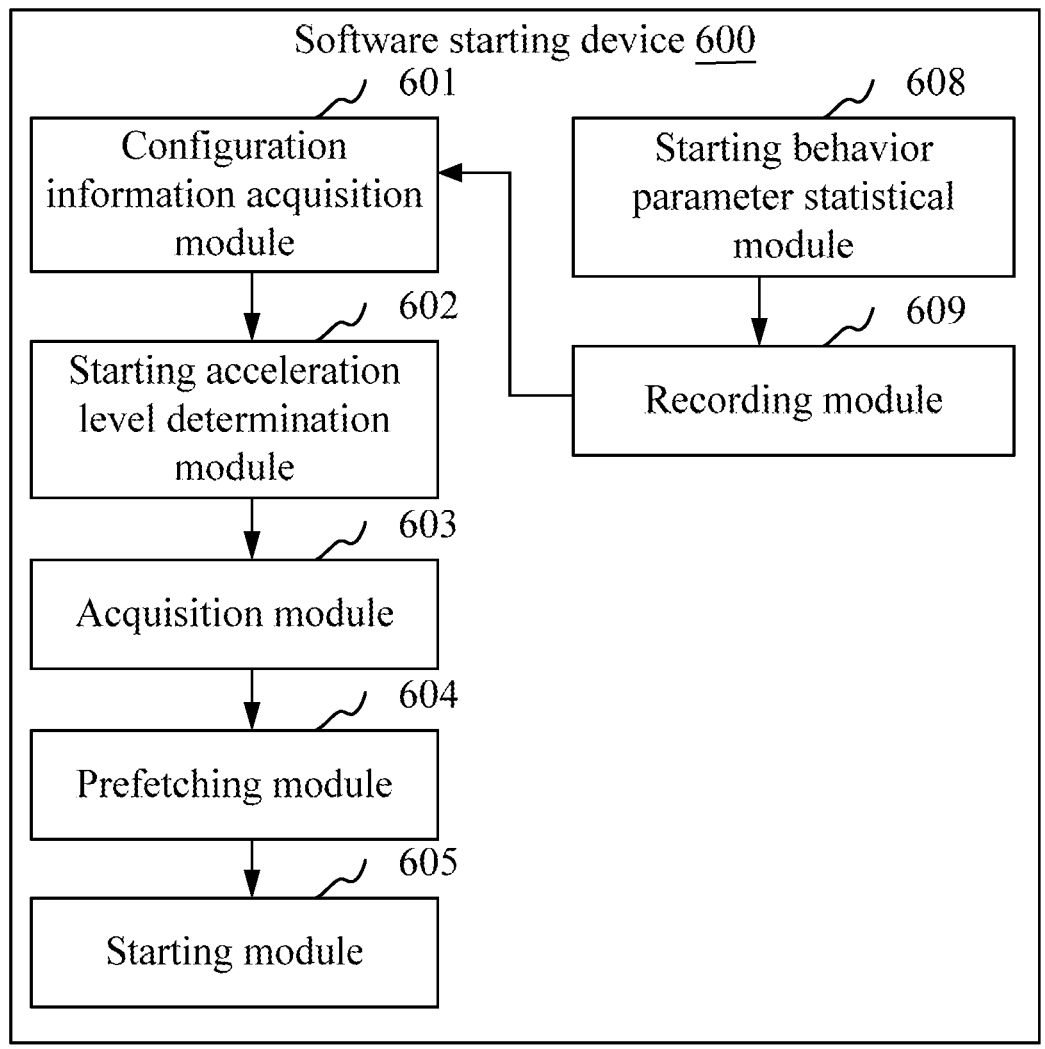
FIG. 8 is a block diagram of a structure of a software starting device according to another embodiment.

As shown in FIG. 8, in an embodiment, the software starting device 600 further includes: a starting behaviour parameter statistical module 608 and a recording module 609.

The starting behaviour parameter statistical module 608 is configured to perform statistics on starting behaviour parameters of the target software. The starting behaviour parameters include at least one of an original starting time length, a number of the starting files, size of the starting file, division of starting stages and a behaviour attribute of file fetching operation during starting.

Specifically, the starting behaviour parameters refer to parameters representing characteristics of the target software during starting. The original starting time length refers to a time length required for starting of the target software without adopting any starting acceleration means. The number of the starting files refers to a total number of starting files required for starting of the target software. The starting file size includes size of each of the starting files and an average of the sizes of the respective starting files. The behaviour attribute of file fetching operation during starting includes a number of file fetching operations initiated during starting of the target software, time distribution of the file fetching operations and the like.

The recording module 609 is configured to generate and record a corresponding starting acceleration level into the configuration file according to the starting behaviour parameters obtained by performing statistics.

The configuration information acquisition module 601 is further configured to fetch the configuration information from the configuration file.

Specifically, the starting behaviour parameters, which are obtained by performing statistics, of the target software may reflect a starting acceleration requirement of the target software, so that the corresponding starting acceleration level can be generated according to the starting behaviour parameters obtained by performing statistics, and in correspondence to a software identifier of the target software, the starting acceleration level is recorded into the configuration file.

For example, the first starting acceleration level may be adopted for target software with a relatively large original starting time length, while the second or third starting acceleration level may be adopted for target software with a relatively small original starting time length. The first starting acceleration level may be adopted for target software with a large number of starting files or with large starting files, while the second or third starting acceleration level may be adopted for target software with a small number of starting files or with small starting files. The starting acceleration level may be configured for each of the starting stages according to division of starting stages. The first starting acceleration level may be adopted for target software with a relatively large number of file fetching operations, and the second or third starting acceleration level may be adopted for target software with a relatively small number of file fetching operations.

In the embodiment, the statistics is performed on the starting behaviour parameters of the target software, and the corresponding starting acceleration level is generated according to the starting behaviour parameters and recorded into the configuration file. As such, a starting acceleration strategy can be flexibly configured according to starting behaviour characteristics of the target software, and higher flexibility and efficiency of starting acceleration can be ensured.

Figure 9:
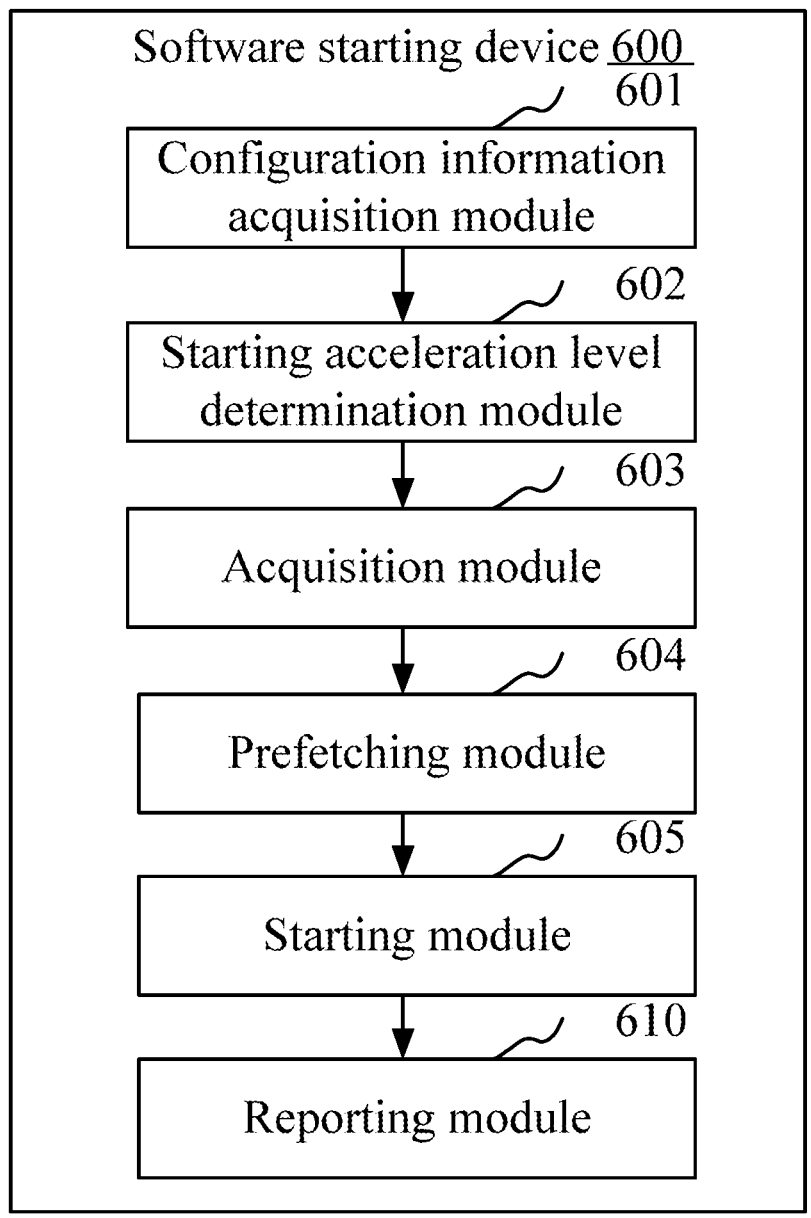
FIG. 9 is a block diagram of a structure of a software starting device according to an embodiment.

As shown in FIG. 9, in an embodiment, the software starting device 600 further includes: a reporting module 610, configured to report a starting acceleration result to the server after a notice indicating that starting of the target software is ended is acquired. The starting acceleration result include at least one of whether starting acceleration succeeds, whether all the starting files of the target software have been prefetched and the number of the prefetched starting files.

Specifically, the notice indicating that starting of the target software is ended may be a notice indicating that the target software is successfully started or a notice indicating that the target software is failed to be started. The notice indicating that starting of the target software is ended may be received by the communication process from the acceleration driving component. The starting acceleration result is reported to the server, and the server may make further analysis and improvement according to the reported starting acceleration result, thereby feeding back preferred configuration information.

Specifically, in case of a starting acceleration failure, the starting acceleration level which is corresponding to the target software, in the configuration information may be modified. If not all the starting files of the target software can be prefetched, a configuration in the configuration information may be modified, wherein the configuration is about whether to suspend the process and is corresponding to the target software. If the number of the prefetched starting files is relatively small and the starting acceleration level corresponding to the target software is the first starting acceleration level, the first starting acceleration level which is corresponding to the target software, in the configuration information may be modified into the second or third starting acceleration level.

According to the software starting device 600, different starting acceleration levels may be divided in advance, and the starting acceleration level of the target software may be determined through the configuration information. Whether the starting files of the target software will be opened once or for many times to prefetch the data in the opened starting files into the memory may be determined according to the number of prefetching operations and/or number of files prefetched in each prefetching operation corresponding to the starting acceleration level. In such a manner, by prefetching the starting files of the target software, the starting speed of the target software can be significantly increased, and the starting time can be reduced. Moreover, the number of times for which the starting files are opened can be flexibly regulated by regulating the number of prefetching operations and/or number of files prefetched in each prefetching operation corresponding to each starting acceleration level. As such, a number of file fetching operations in each prefetching operation can be controlled, and applicability to different starting acceleration requirements of various kinds of software and high compatibility can be achieved.

Those skilled in the art will understand that all or part of the flows in the methods of the embodiments may be implemented by related hardware instructed by a computer program. The program may be stored in computer-readable storage medium, and when the program is executed, can execute the flows of the embodiments of each of the above-mentioned methods. The storage medium may be a non-volatile storage medium such as a magnetic disk, an optical disk and a Read-Only Memory (ROM), or a Random Access Memory (RAM) and the like.

The various technical features of the abovementioned embodiments can be freely combined. In order to simplify description, not all possible combinations of the various technical features of the abovementioned embodiments are described. However, any combinations of these technical features shall be construed as falling within the scope recorded by the specification as long as there is no conflict in the combinations.

The above embodiments only describe some implementations of the disclosure, are specifically described in detail. However, the above embodiment should not be construed as limits to the scope of patent of the disclosure. It is to be pointed out that those skilled in the art can further make a plurality of variations and improvements without departing from the concept of the disclosure, and the variations and improvements all fall within the scope of protection of the disclosure. Therefore, the scope of protection of the patent of the disclosure will be defined by the appended claims.

The invention claimed is:

1. A method for starting software carried out in an electronic apparatus, comprising:
acquiring configuration information which is information for configuring a starting acceleration mode adopted for starting target software;
determining a starting acceleration level of the target software according to the configuration information;
acquiring at least one of a number of prefetching operations and number of files prefetched in each prefetching operation, corresponding to the determined starting acceleration level;
opening starting files of the target software and prefetching data in the starting files into a memory in each prefetching operation, according to the at least one of the determined number of prefetching operations and number of files prefetched in each prefetching operation; and
starting the target software according to the data prefetched into the memory,
wherein determining the starting acceleration level of the target software according to the configuration information comprises:
determining division of starting stages of the target software according to the configuration information, and determining starting acceleration level of each of the starting stages; and
opening the starting files of the target software and prefetching the data in the starting files into the memory in each prefetching operation according to at least one of the determined number of prefetching operations and number of files prefetched in each prefetching operation comprises:
in each starting stage, opening the starting files of the target software and prefetching the data in the starting files into the memory in each prefetching operation by adopting at least one of the number of prefetching operations and number of files prefetched in each prefetching operation corresponding to the starting acceleration level of the starting stage.

2. The method according to claim 1, wherein the determined starting acceleration level is a first starting acceleration level; and opening the starting files of the target software and prefetching the data in the starting files into the memory in each prefetching operation according to at least one of the determined number of prefetching operations and number of files prefetched in each prefetching operation comprises:
opening all the starting files of the target software and prefetching the data in all the opened starting files into the memory.

3. The method according to claim 2, after opening all the starting files of the target software, and before prefetching the data in all the opened starting files into the memory, the method further comprising:
suspending a starting process of the target software; and
after opening all the starting files of the target software and prefetching the data in all the opened starting files into the memory, the method further comprising:
resuming the starting process.

4. The method according to claim 3, wherein suspending the starting process of the target software comprises:
receiving, by a custom function registered in an operating system, a first notice sent by a system callback function interface when starting the starting process of the target software, and awaiting; and
resuming the starting process comprises:
feeding back, by the custom function, a second notice to the system callback function interface to cause the operating system to continue running the starting process.

5. The method according to claim 1, wherein the determined starting acceleration level is a second starting acceleration level; and opening the starting files of the target software and prefetching the data in the target software into the memory in each prefetching operation according to at least one of the determined number of prefetching operations and number of files prefetched in each prefetching operation comprises:
repeatedly executing a step of opening a number of starting files of the target software and prefetching data in the starting files opened in each prefetching operation into the memory, until the data of all the starting files of the target software is prefetched into the memory, the number being the number of files prefetched in each prefetching operation.

6. The method according to claim 5, further comprising:
fetching, by the starting process of the target software, the data from the starting files of the target software, wherein
starting the target software according to the data prefetched into the memory comprises:
starting the target software according to the data fetched by the starting process and the data prefetched into the memory.

7. The method according to claim 1, wherein the determined starting acceleration level is a third starting acceleration level; and opening the starting files of the target software in each prefetching operation according to at least one of the determined number of prefetching operations and number of files prefetched in each prefetching operation and prefetching the data into the memory comprises:
repeatedly executing the step of opening the starting file of the target software and prefetching data in the starting file into the memory, until the data of all the starting files of the target software is prefetched into the memory.

8. The method according to claim 1, further comprising:
performing statistics on starting behaviour parameters of the target software comprising at least one of an original starting time length, a number of the starting files, size of the starting file, division of starting stages and a behaviour attribute of file fetching operation during starting; and
generating a starting acceleration level and recording the starting acceleration level into a configuration file, according to the starting behaviour parameters obtained by performing statistics, wherein
wherein acquiring the configuration information comprises:
fetching the configuration information from the configuration file.

9. The method according to claim 1, further comprising:
reporting a starting acceleration result to a server after a notice indicating that starting of the target software is ended is acquired, the starting acceleration result comprising at least one of whether starting acceleration succeeds, whether all the starting files of the target software have been prefetched and a number of the prefetched starting files.

10. A terminal for starting software, comprising a memory storing instructions and a processor, wherein the instructions are executed by the processor to cause the processor to execute the steps of:
  acquiring configuration information which is information for configuring a starting acceleration mode adopted for starting target software;
  determining a starting acceleration level of target software according to the configuration information;
  acquiring at least one of a number of prefetching operations and number of files prefetched in each prefetching operation, corresponding to the determined starting acceleration level;
  opening starting files of the target software and prefetching data in the starting files into a memory in each prefetching operation, according to at least one of the determined number of prefetching operations and number of files prefetched in each prefetching operation; and
  starting the target software according to the data prefetched into the memory,
  wherein determining the starting acceleration level of the target software according to the configuration information comprises:
  determining division of starting stages of the target software according to the configuration information, and determining starting acceleration level of each of the starting stages; and
  opening the starting files of the target software and prefetching the data in the starting files into the memory in each prefetching operation according to at least one of the determined number of prefetching operations and number of files prefetched in each prefetching operation comprises:
  in each starting stage, opening the starting files of the target software and prefetching the data into the memory in each prefetching operation by adopting at least one of a number of prefetching operations and number of files prefetched in each prefetching operation corresponding to the starting acceleration level of the starting stage.

11. The terminal according to claim 10, wherein the determined starting acceleration level is a first starting acceleration level; and opening the starting files of the target software and prefetching the data in the starting files into the memory in each prefetching operation according to at least one of the determined number of prefetching operations and number of files prefetched in each prefetching operation comprises:
  opening all the starting files of the target software and prefetching the data in all the opened starting files into the memory.

12. The terminal according to claim 11, wherein the instructions are executed by the processor to further cause the processor to:
  after opening all the starting files of the target software and before prefetching the data in all the opened starting files into the memory, execute a step of suspending a starting process of the target software; and
  after opening all the starting files of the target software and prefetching the data in all the opened starting files into the memory, execute a step of resuming the starting process.

13. The terminal according to claim 12, wherein suspending the starting process of the target software comprises:
  receiving, by a custom function registered in an operating system, a first notice sent by a system callback function interface when starting the starting process of the target software, and awaiting; and
  resuming the starting process comprises:
  feeding back, by the custom function, a second notice to the system callback function interface to cause the operating system to continue running the starting process.

14. The terminal according to claim 10, wherein the determined starting acceleration level is a second starting acceleration level; and opening the starting files of the target software and prefetching the data in the starting files into the memory in each prefetching operation according to at least one of the determined number of prefetching operations and number of files prefetched in each prefetching operation comprises:
  repeatedly executing a step of opening a number of starting files of the target software and prefetching data in the starting files opened in each prefetching operation into the memory, until the data of all the starting files of the target software is prefetched into the memory, the number being the number of files prefetched in each prefetching operation.

15. The terminal according to claim 14, further comprising:
  fetching the data from the starting files of the target software through the starting process of the target software, wherein
  starting the target software according to the data prefetched into the memory comprises:
  starting the target software according to the data fetched by the starting process and the data prefetched into the memory.

16. The terminal according to claim 10, wherein the determined starting acceleration level is a third starting acceleration level; and opening the starting files of the target software and prefetching the data in the starting files into the memory in each prefetching operation according to at least one of the determined number of prefetching operations and number of files prefetched in each prefetching operation comprises:
  repeatedly executing the step of opening the starting file of the target software and prefetching data in the starting file into the memory, until the data of all the starting files of the target software is prefetched into the memory.

17. The terminal according to claim 10, further comprising:
  performing statistics on starting behaviour parameters of the target software, the starting behaviour parameters comprising at least one of an original starting time length, a number of the starting files, size of the starting file, division of starting stages and a behaviour attribute of file fetching operation during starting; and
  generating and recording a starting acceleration level into a configuration file according to the starting behaviour parameters obtained by performing statistics, wherein
  wherein acquiring the configuration information comprises:
  fetching the configuration information from the configuration file.

18. Non-volatile computer-readable storage media or medium storing computer-executable instructions, that when being executed by one or more processors, cause the one or more processors to execute the steps of:
  acquiring configuration information which is information for configuring a starting acceleration mode adopted for starting target software;

determining a starting acceleration level of target software according to the configuration information;

acquiring at least one of a number of prefetching operations and number of files prefetched in each prefetching operation, corresponding to the determined starting acceleration level;

opening starting files of the target software and prefetching data in the starting files into a memory in each prefetching operation, according to at least one of the determined number of prefetching operations and number of files prefetched in each prefetching operation; and starting the target software according to the data prefetched into the memory, wherein determining the starting acceleration level of the target software according to the configuration information comprises:

determining division of starting stages of the target software according to the configuration information, and determining starting acceleration level of each of the starting stages; and opening the starting files of the target software and prefetching the data in the starting files into the memory in each prefetching operation according to at least one of the determined number of prefetching operations and number of files prefetched in each prefetching operation comprises:

in each starting stage, opening the starting files of the target software and prefetching the data in the starting files into the memory in each prefetching operation by adopting at least one of the number of prefetching operations and number of files prefetched in each prefetching operation corresponding to the starting acceleration level of the starting stage.

* * * * *